United States Patent [19]

Stocchiero

[11] Patent Number: 5,298,344
[45] Date of Patent: Mar. 29, 1994

[54] DEVICE FOR EXHAUSTING THE FUMES FORMING INSIDE ACCUMULATION BATTERIES

[76] Inventor: Olimpio Stocchiero, 5 Via Kennedy, 36050 Montorso Vicentino (VI), Italy

[21] Appl. No.: 950,890

[22] Filed: Sep. 25, 1992

[51] Int. Cl.$^5$ .......................................... H01M 02/12
[52] U.S. Cl. ........................................... 429/53; 429/86
[58] Field of Search ............................. 429/53, 83, 86

[56] References Cited

U.S. PATENT DOCUMENTS

| 2,394,333 | 2/1946 | Schneider | 429/86 |
| 3,904,441 | 9/1975 | Badger | 429/86 |
| 4,851,305 | 7/1989 | Kump et al. | 429/84 |
| 5,108,853 | 4/1992 | Feres | 429/86 |

FOREIGN PATENT DOCUMENTS

| 9005603 | 7/1990 | Fed. Rep. of Germany . |
| 9015535 | 3/1991 | Fed. Rep. of Germany . |
| WO8604186 | 7/1986 | PCT Int'l Appl. . |
| 2042249 | 9/1980 | United Kingdom . |

OTHER PUBLICATIONS

English language translation of the claims in DE 9015535 (Mar. 1991).
English language translation of the claims in DE 9005603 (Jul. 1990).

Primary Examiner—Stephen Kalafut
Attorney, Agent, or Firm—Watson, Cole, Grindle & Watson

[57] ABSTRACT

The invention discloses a device for exhausting fumes formed inside accumulators. A chamber formed in the lid of the accumulator communicates with exhaust ducts connected with one another and the accumulator re-fill openings. An anti-explosion paste is located in the chamber and is kept in position by the adherence of a removable cap having a through-going central exhaust opening. A shoulder in the chamber presents a surface against which the anti-explosion paste rests and defines a pre-chamber between the paste and the exhaust duct. The bottom of the pre-chamber has an opening allowing it to communicate with the underlying elements of the accumulator and to drain condensed vapor.

7 Claims, 2 Drawing Sheets

DEVICE FOR EXHAUSTING THE FUMES
FORMING INSIDE ACCUMULATION BATTERIES

BACKGROUND OF THE INVENTION

The invention concerns a device for exhausting the fumes forming inside accumulator batteries.

It is a known fact that, particularly in lead accumulator batteries, during their working stage and/or during the recharging stage, fumes form which must be exhausted since, if that is not done, they would cause an inflating of the accumulator with the consequent possible breakage of the same. For this reason the lids are provided with exhaust ducts which connect with one another the refill openings of the accumulator which are made on the lid and open them to the exterior through outlet openings In one or more of said outlet openings a joint complete with a hose is provided for the conveyance of the fumes to the exterior.

Since the fumes forming inside the accumulator also contain highly explosive hydrogen, in some cases it is necessary to also apply an anti-explosion device which, should flames or sparkles be present in the room around the accumulator, has the purpose of preventing the flames or the sparks from entering into the accumulator through the exhaust ducts and causing the explosion by igniting the fumes which are present within the exhaust ducts of the lid. Said anti-explosion device consists of a paste according to a known technique which is made of a material allowing the fumes inside the accumulator to be exhausted, but preventing the entrance into the exhaust ducts of the lid of eventual flames and sparks, which would cause its explosion.

In some constructions this anti-explosion paste is held in a container which is an integral part of the joint applied in the opening of the exhaust duct. In particular, said paste is arranged between the union connecting the joint with the outlet opening of the exhaust duct and the hose conveying the fumes away from the accumulator.

On the other hand, in some other embodiments according to the known technique, the anti-explosion paste is part of the lid of the accumulator and it is positioned within a chamber near the outlet opening of the exhaust ducts.

In both types of embodiment there is the inconvenience that, since the anti-explosion paste is permeable to fumes but not to liquids, it clogs up whenever the condensation resulting from the electrolyte liquid, which is led into the fume-exhaust ducts in the form of vapor, comes to rest on the point of connection of the paste. It is easy to understand how such an occurrence can cause remarkable inconveniences and also dangers, since, if this occurs, the fumes are not let out and they build up inside the accumulator. This causes, as has already been said, the inflating of the accumulator and its ensuing deformation.

SUMMARY OF THE INVENTION

In order to avoid this inconvenience, the device according to the present invention has the main purpose of warranting the constant exhaust of the fumes from the interior of the accumulator, even if condensation forms on the anti-explosion paste of the vaporized electrolyte, which has found its way into the fume exhaust ducts during the phase, when they are exhausted outside the accumulator.

The described purpose is reached through a device for the exhaust of the fumes forming inside the accumulators, which, in accordance with the main claim, comprises:

a chamber, formed in the accumulator lid, communicating on one side with the exhaust ducts which connect with one another the re-fill openings of the accumulator and are also found in the lid and, on the opposite side, communicating with the outside environment;

an anti-explosion paste, placed within said chamber;

a removable cap having a central through-going opening, inserted in the chamber and adhering against the paste, and characterized in that said chamber has between said paste and its own bottom, a pre-chamber for the collection of the condensed electrolyte vapors, which communicates with the underlying elements of the accumulator through at least one through-going hole.

According to a preferred embodiment, the chamber containing the anti-explosion paste has a cylindrical shape and is located in the vertical wall of the peripheral rim of the lid, in correspondence with the outlet opening of each exhaust duct.

In one example of embodiment of the invention, the removable cap pushes the anti-explosion paste flush against the shoulder and it is inserted in the cylindrical chamber with an interference, so as to achieve, in correspondence with the lateral surface of mutual contact, the tightness with the cylindrical chamber.

The anti-explosion paste also achieves the tightness with its lateral surface, which interferes with the inner lateral surface of the cylindrical chamber containing it.

In another embodiment of the invention the cap is provided with an annular recess lodging the anti-explosion paste.

Advantageously, in the case of condensation of the electrolyte forming on the anti-explosion paste, the device according to the invention insures both the backflow of the condensed electrolyte into the accumulator, and the continued discharge of the exhaust fumes. The possibility for the anti-explosion paste to clog is, therefore, eliminated, while, at the same time, the efficiency of the fume-exhaust system is guaranteed.

Moreover, the device according to the invention also advantageously prevents the electrolyte from dripping out of the accumulator.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description and from the drawings, wherein.

DESCRIPTION OF THE PREFERRED EMBODIMENTS

Figure 1:
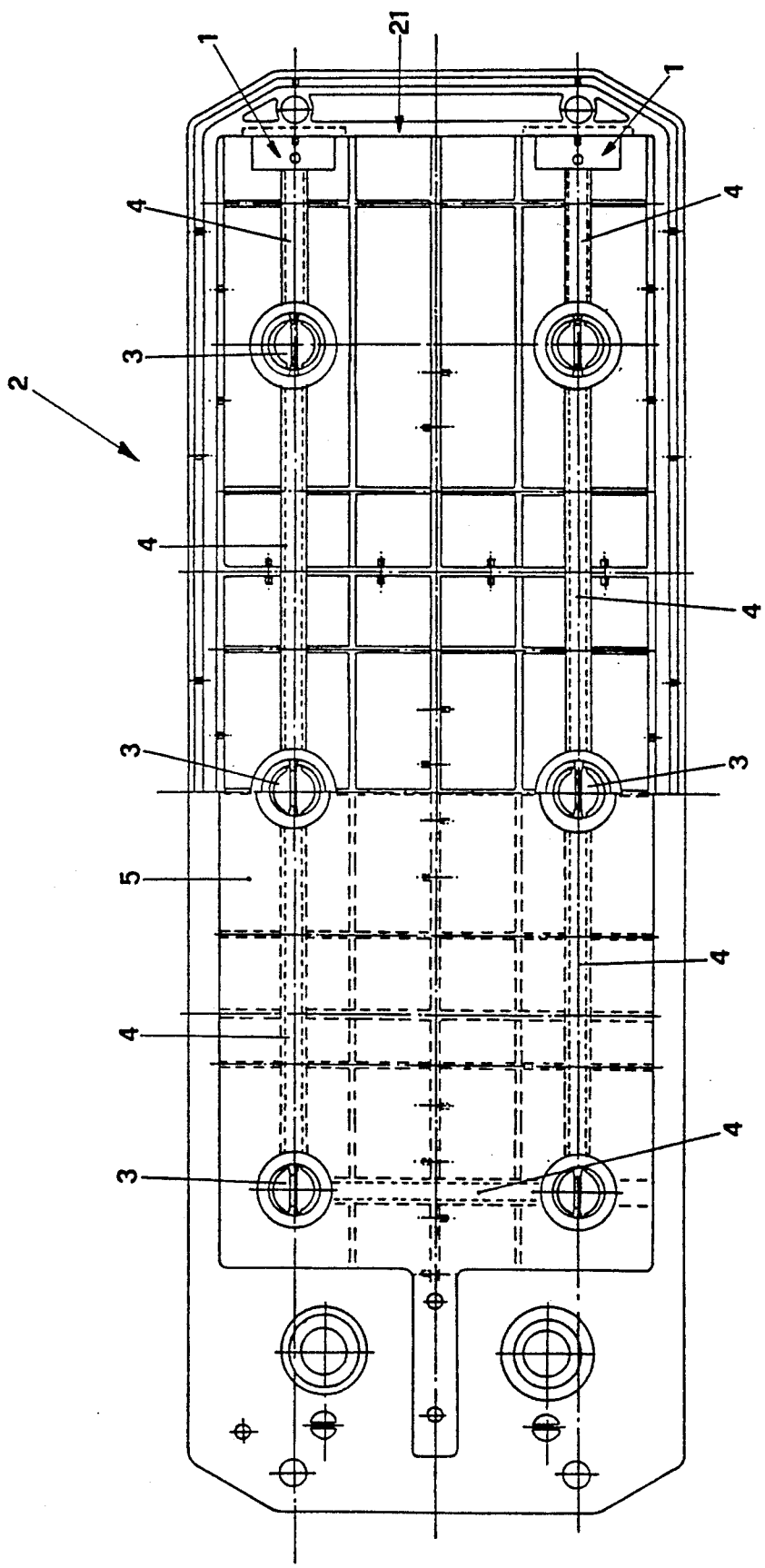
FIG. 1 is a top view of an accumulator lid to which the device for the fume exhaust according to the invention has been applied.
Figure 2:
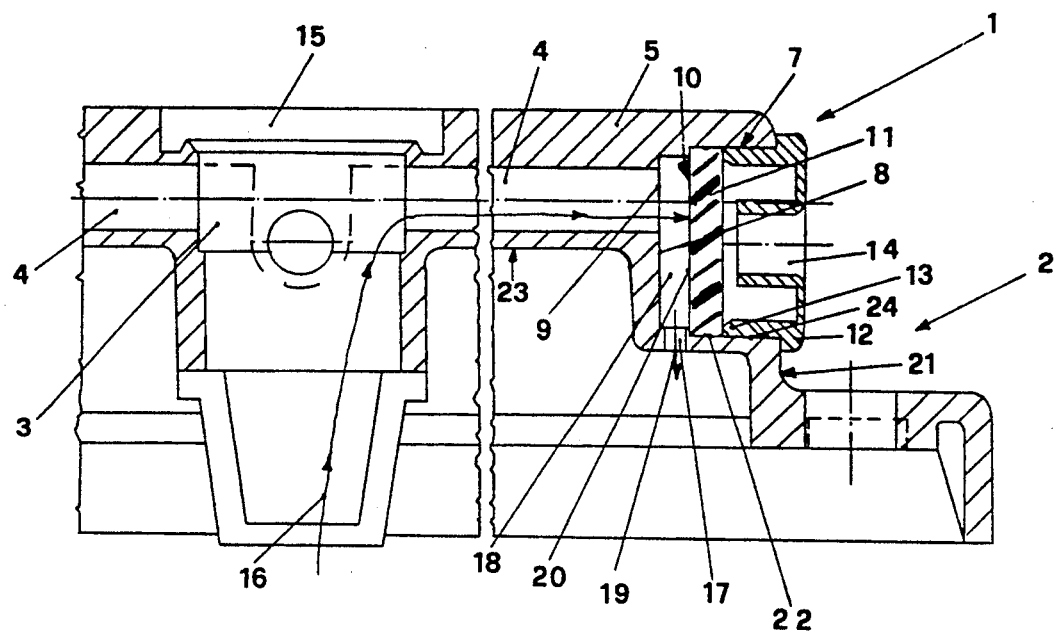
FIG. 2 is the magnified view of a vertical section made in the lid in correspondence with an exhaust duct in which the exhaust device according to the invention has been applied.

As can be observed in FIG. 1, the exhaust device according to the invention, indicated as a whole with 1, is applied on an accumulator lid, indicated as a whole with 2, which has a plurality of re-fill openings 3, which are connected to one another through a plurality of exhaust ducts 4, which, as can be observed in FIG. 2, are formed in the upper wall 5 of the accumulator lid 2, near its inner surface 23 facing the interior of the accumulator.

In correspondence with the lateral wall 21 of lid 2, at the spot where said ducts 4 communicate with the outside environment, there is, as can be seen in FIG. 2, a cylindrical chamber 7, the circular wall 8 of which communicates through a hole 9, with one of the exhaust ducts 4, while its lateral inner surface has in an intermediate position a shoulder 10. Against this shoulder 10 the anti-explosion paste 11 is pushed flush by the pressure of the annular rim 13 of cap 12 inserted in the cylindrical chamber 7.

Said cap 12 has also an interference with the cylindrical chamber 7 wherein it is inserted in correspondence with the lateral walls 24 in mutual contact with each other and, as a consequence, cap 12 is tightly connected with the cylindrical chamber 7. Said interference between cap 12 and the cylindrical chamber 7 holds paste 11 within the cylindrical chamber with a force which contrasts against the inner pressure produced by the fumes forming inside the accumulator. By suitably adjusting the value of said interference, it is possible to pre-set the maximum pressure threshold, beyond which paste 11 and cap 12 are pushed out of cylindrical chamber 7, so that the device according to the invention also acquires the characteristics of a safety valve. Moreover, the anti-explosion paste 11, in correspondence with its lateral surface 22 is also tightly inserted into said cylindrical chamber 7.

The middle of cap 12 has an opening 14, into which a joint (not represented in the drawing) with a hose is inserted. This has the task of conveying the fumes out of the accumulator. In fact, through the re-fill openings 3, which are shut by the caps 15, the fumes forming inside the cells of the accumulator are conveyed following direction 16 into the exhaust ducts 4 and from here, going through hole 9 and the anti-explosion paste 11, they are conveyed outside.

During said fume exhaust, part of the electrolyte turns into vapor and is entrained by the fumes, following direction 16, along the exhaust ducts 4, until it reaches the anti-explosion paste 11, which stops it and there it condenses. This is the reason why in the cylindrical chamber 7 the described shoulder 10 has been made; paste 11 contacts against it, so that surface 20 of paste 11 and circular wall portion 8 of the cylindrical chamber 7 define a pre-chamber 18 which collects the condensing electrolyte vapor, which then falls back down, following direction 19, into one or more accumulator cells going through hole 17. Thus there is never a chance of liquid building up close to the anti-explosion paste 11, which can continue its fume-exhausting activity, its efficiency remaining unchanged in time, thus reaching the purpose proposed by the invention.

The dripping of electrolyte in the outside environment is also prevented. Also, should there be an overpressure build-up, when the same exceeds the value of the interference of cap 12 in chamber 7, cap 12 and paste 11 are pushed out of chamber 7, so that the exhaust device also acts as a safety valve.

Figure 3:
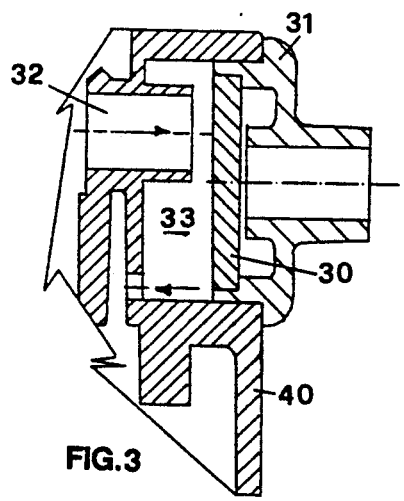
FIG. 3 shows in a cross-section a different embodiment of the fume-exhaust device according to the invention.

FIG. 3 shows a different embodiment of the invention. This embodiment varies from the previously described one, in that the anti-explosion paste 30 is lodged in the annular recess of cap 31, positioned at the end of the exhaust duct 32 of the lid 40. In this case, too, there is a pre-chamber 33 which collects the condensed electrolyte vapor. The pre-chamber 33 has a hole 34 at its bottom, having the purpose of discharging the electrolyte which has condensed in the pre-chamber.

One or more of the described devices can be applied on the accumulator lid, i.e. it will be possible to realize in correspondence with each exhaust duct a cylindrical chamber suited to lodge an anti-explosion paste or, should the exhaust duct be central, as described in the Italian patent application No. VI91A000089, the device will be single and it will be applied in the single central duct.

During the manufacturing stage the device according to the invention may undergo changes and modifications having the purpose of improving its efficiency and to make its manufacture easier. Said changes and modifications will, however, not exceed the scope protected by the present invention.

I claim:

1. A device for exhausting fumes formed within the lid of an accumulator comprising: a chamber formed in the accumulator lid having inlet opening and an outlet opening and said lid having an exhaust duct in communication with one side of the chamber through the inlet opening and on the opposite side of the chamber, communicating with the outside environment through the outlet opening:

an anti-explosion paste located within the chamber in spaced relation with the inlet opening;

a removable cap having a central through opening located in the outlet opening of the chamber and adhering against the paste such that the cap forms a pre-chamber between the paste and the inlet opening, said pre-chamber for collecting condensed electrolyte vapors from the accumulator, said pre-chamber having a drain hole formed in a wall portion below the inlet opening, said drain hole being located remote from the inlet and indirect serial flow communication with the interior of the accumulator from the pre-chamber for returning vapor condensate thereto without back flow of said condensate through the inlet.

2. A device according to claim 1, wherein the removable cap is inserted in the chamber with a junction which interferes in correspondence with the lateral surfaces in mutual contact between said cap and said chamber.

3. A device according to claim 1, wherein the anti-explosion paste is located between a shoulder formed in the chamber and the cap.

4. A device according to claim 1, wherein the anti-explosion paste is inserted under pressure into a cylindrical recess of the cap.

5. A device according to claim 1, wherein the chamber is formed in a lateral wall of the lid.

6. A device according to claim 5, wherein the chamber is located centrally in the lateral wall of the lid.

7. A device for exhausting fumes emanating from a refill port of an accumulator without interference from fume condensate comprising:

a lid portion having a refill opening for engaging the refill port of the accumulator, an exhaust chamber communicating with the exterior of the lid portion, and an exhaust duct interconnecting the refill opening and the exhaust chamber, said exhaust chamber having a cap receiving portion adjacent the exterior of the lid portion and a pre-chamber portion located between the exhaust duct and the cap receiving portion; an anti-explosion paste securable in the cap receiving portion adjacent the pre-chamber and being permeable to exhaust fumes; and a removable cap locatable in the cap receiving portion having a through exhaust opening in flow communication with the refill opening, the exhaust duct, the pre-chamber and the exterior of the lid portion, said pre-chamber having a drain opening in direct flow communication with an interior portion of the accumulator through said lid, said drain opening being located remote from the refill port below the exhaust duct for allowing vapor condensate to drain directly from the pre-chamber into the accumulator without back flow of said condensate to the refill port whereby the exhaust opening remains clear.

* * * * *